United States Patent
Gazdik et al.

(10) Patent No.: US 7,075,665 B1
(45) Date of Patent: Jul. 11, 2006

(54) CREATING OPERATING SYSTEM FONTS FROM PRINTER FONT METRICS

(75) Inventors: Charles J. Gazdik, Boise, ID (US); Elliot Lee Klosterman, Boise, ID (US); Shane Konsella, Boise, ID (US); Kwesi E. Abraham, Boise, ID (US); Michael S. De Laurentis, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1149 days.

(21) Appl. No.: 09/304,968

(22) Filed: May 4, 1999

(51) Int. Cl.
*G06F 3/12* (2006.01)
*G06F 13/00* (2006.01)

(52) U.S. Cl. .................. 358/1.11; 358/1.9
(58) Field of Classification Search .............. 358/1.11; 395/805; 345/467–472, 948
See application file for complete search history.

(56) References Cited

U.S. PATENT DOCUMENTS

| | | | | |
|---|---|---|---|---|
| 5,689,724 A * | 11/1997 | Morgan et al. | ............. | 395/805 |
| 5,771,034 A * | 6/1998 | Gibson | ........................ | 345/141 |
| 5,877,776 A * | 3/1999 | Beaman et al. | ............. | 345/472 |
| 6,065,008 A * | 5/2000 | Simon et al. | ................. | 707/10 |
| 6,288,726 B1 * | 9/2001 | Ballard | ........................ | 345/468 |

* cited by examiner

Primary Examiner—Douglas Q. Tran

(57) ABSTRACT

An operating system font is created from a printer metrics file. The printer metrics file includes at least one set of font metrics. Each set of font metrics represents one font. The printer metrics file is opened and the font metrics are read. A system font is created from each set of font metrics. The system font is created by applying the font metrics to a font template. The font template with the applied font metrics is saved as a system font. The system font is then installed and registered with the operating system. A name of the operating system font is recorded with a printer driver associated with the printer metrics file.

20 Claims, 2 Drawing Sheets

CREATING OPERATING SYSTEM FONTS FROM PRINTER FONT METRICS

FIELD OF THE INVENTION

This invention relates in general to printer fonts and, more particularly, to a system and method for creating an operating system font from a printer metrics file.

BACKGROUND OF THE INVENTION

Manufacturers of printers often create fonts to be used by the printer. These fonts are often referred to as printer fonts. These printer fonts are usually embedded in devices associated with the printer. Examples of devices with embedded fonts include font cartridges and memory modules.

Since the fonts reside on a device and not in the operating system, they are not readily accessible by software applications. A device driver for the printer communicates with the software application to allow software applications to use the printer fonts when printing to the printer.

Differences in output will occur when a document is created using one of the printer fonts, then printed on a different printer using a printer driver that knows nothing about the printer font used in the document. The device driver for the printer used to print the document will not properly handle the printer font that it knows nothing about. Instead, the device driver will print an approximation of the font.

Printer metrics files describe the characteristics of specific fonts that are embedded in the devices. Printer metrics files are often referred to as printer font metrics (PFM) files and printer cartridge metrics (PCM) files. PCM files are typically a collection of PFM files represented as one physical file. The printer driver reads the printer metrics files and uses the information contained in the printer metrics files to display an approximation of the printer font on a screen for a user to view.

SUMMARY OF THE INVENTION

According to principles of the present invention, an operating system font is created from a printer metrics file. The printer metrics file includes at least one set of font metrics. Each set of font metrics represents one font. The printer metrics file is opened and the font metrics are read. A system font is created from each set of font metrics. A system font created by the present invention is the metric equivalent to the font whose printer metrics were used to create the system font. However, the system font may appear different from the font whose printer metrics were used to create the system font.

The system font is created by applying the font metrics to a font template. The font template with the applied font metrics is saved as a system font. The system font is then installed and registered with the operating system. A name is determined for the operating system font and the name is recorded with a printer driver associated with the printer metrics file.

Other objects, advantages, and capabilities of the present invention will become more apparent as the description proceeds.

DETAILED DESCRIPTION OF THE INVENTION

Figure 1:
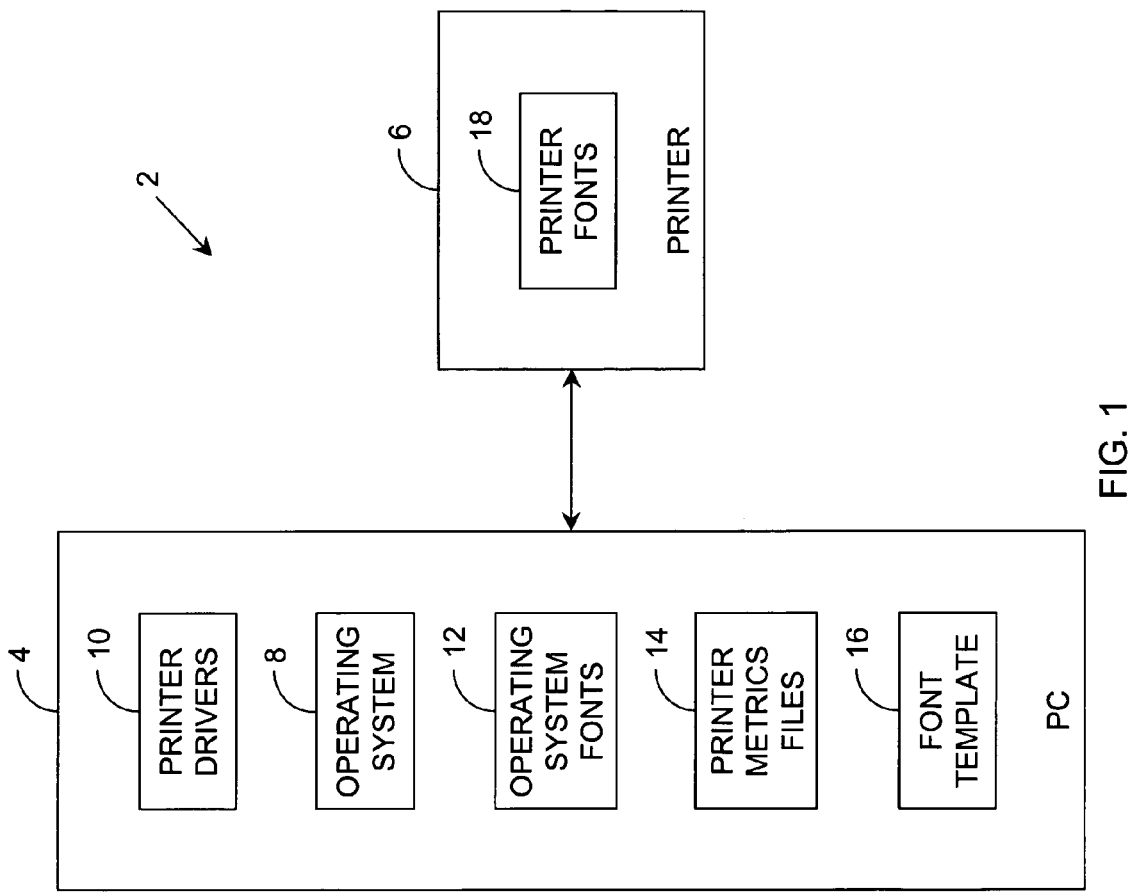
FIG. 1 is a block diagram illustrating the components of the present invention.

FIG. 1 illustrates a system 2 including a computer (PC) 4 and a printer 6. Residing on PC 4 are an operating system 8, printer drivers 10, operating system fonts 12, printer metrics files 14, and font template 16. Residing on printer 6 are printer fonts 18. Typically, printer metrics files 14 reside on an external device such as a floppy disk. However, when using the printer metrics files 14 to create an operating system font 12, the printer metrics files 14 must be accessible by PC 4. This is most easily accomplished by copying the printer metrics files 14 to PC 4.

Printer metrics files 14 each contain information about one or more printer fonts 18. Information about each font is grouped into a set of font metrics. The set of font metrics for each printer font 18 typically includes the selection string, character set, point size, scalability, width, and height of printer font 18 and whether printer font 18 is bolded, italicized, or both. A selection string is a string used to select the printer font 18 from those printer fonts 18 residing in printer 6.

Figure 2:
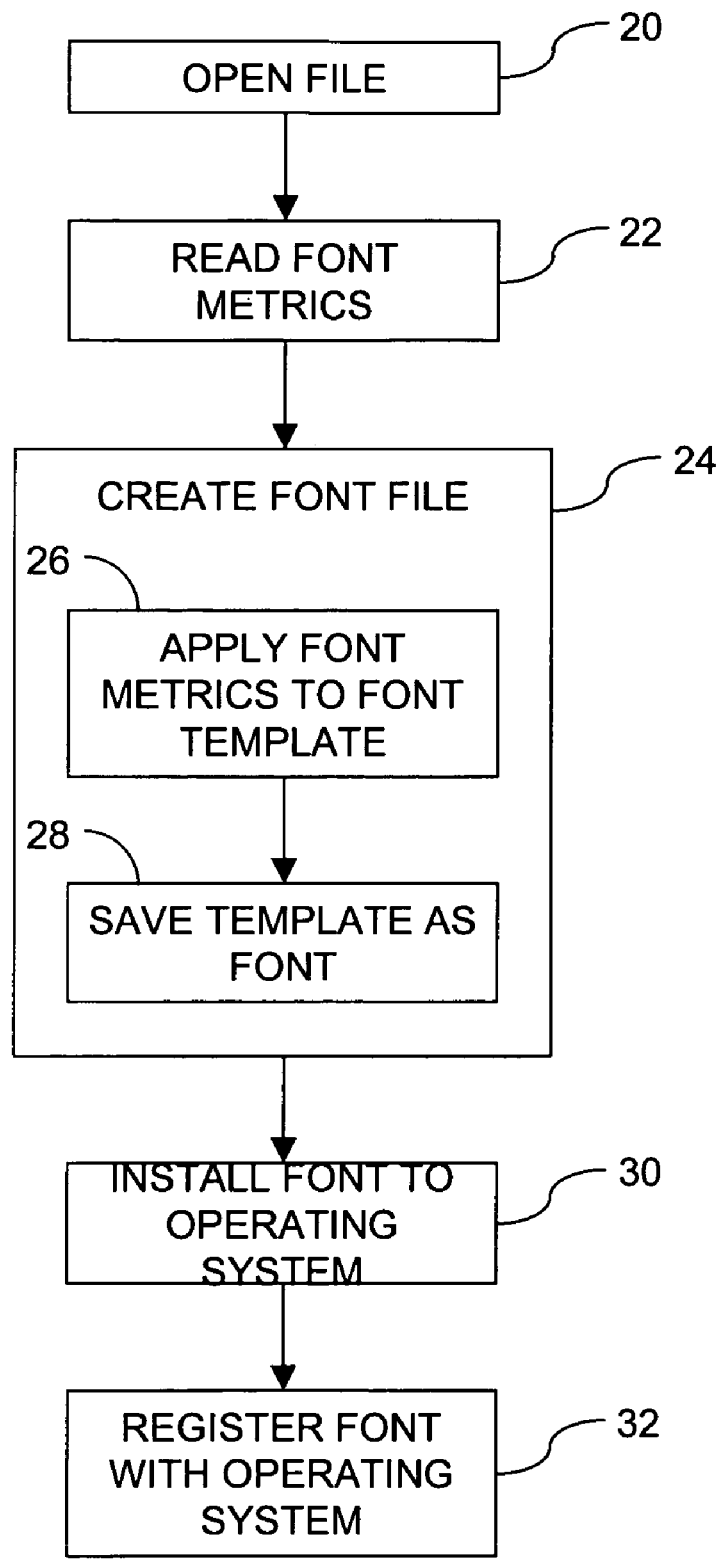
FIG. 2 is a flow chart depicting one embodiment of the method of the present invention.

FIG. 2 illustrates one embodiment of the process of the present invention. First, one of the printer metrics files 14 is opened 20. Next, a set of font metrics is read 22 from the opened printer metrics file 14. An operating system font 12 is then created 22 from the set of font metrics.

Alternatively, all of the sets of font metrics are read 22 from the opened printer metrics file 14 and multiple operating system fonts are created from the sets of font metrics.

Operating system font 12 is created 22 by applying 26 the set of font metrics from printer metrics file 14 to font template 16. Font template 16 is a file that includes all of the information necessary to create an operating system font 12, except for the information contained in the set of font metrics retrieved from printer metrics file 14. After applying 26 the set of font metrics to the font template 16, font template 16 is saved 28 as an operating system font 12.

The new operating system font 12 may then be installed 30 into and registered 32 with operating system 8 of PC 4. The present invention is most useful with the various Windows operating systems. However, operating system 8 may be any computer operating system.

The process illustrated in FIG. 2 may then be repeated for each set of font metrics in the printer metrics file 14 and repeated for multiple printer metrics files 14.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for creating at least one operating system font from a printer metrics file containing at least one set of font metrics, each set of font metrics representing one font, the method comprising:

(a) opening a printer metrics file;

(b) reading one set of the at least one set of font metrics from the printer metrics file; and, (c) creating an operating system font from the one read set of font metrics.

2. The method of claim 1 wherein reading the one set of font metrics includes reading at least the width and height of the font represented by the one read set of font metrics.

3. The method of claim 1 wherein creating the operating system font from the one read set of font metrics includes:
 (a) applying the one read set of font metrics to a font template; and,
 (b) saving the font template as an operating system font.

4. The method of claim 1 further including installing the operating system font on an operating system.

5. The method of claim 4 further including registering the operating system font with an operating system.

6. The method of claim 1 further including:
 (a) determining a name for the operating system font; and,
 (b) recording the name of the operating system font with a printer driver associated with the printer metrics file.

7. The method of claim 1 further including repeating steps (b) and (c) for each of the at least one set of font metrics contained in the printer metrics file.

8. A system for creating at least one operating system font from a printer metrics file containing at least one set of font metrics, each set of font metrics representing one font, the system comprising:
 (a) means for opening a printer metrics file;
 (b) means for reading one set of the at least one set of font metrics from the printer metrics file; and,
 (c) means for creating an operating system font from a read set of font metrics.

9. The system of claim 8 wherein the means for reading the one set of font metrics includes means for reading at least the width and height of the font represented by the one set of font metrics.

10. The system of claim 8 wherein the means for creating the operating system font from the one set of font metrics includes:
 (a) means for applying the one set of font metrics to a font template; and,
 (b) means for saving the font template as an operating system font.

11. The system of claim 8 further including means for installing the operating system font on an operating system.

12. The system of claim 11 further including means for registering the operating system font with an operating system.

13. The system of claim 8 further including:
 (a) means for determining a name for the operating system font; and,
 (b) means for recording the name of the operating system font with a printer driver associated with the printer metrics file.

14. A program storage device readable by a computer, tangibly embodying a program, applet, or instructions executable by the computer to perform method steps for creating at least one operating system font from a printer metrics file containing at least one set of font metrics, each set of font metrics representing one font, the method steps comprising:
 (a) opening a printer metrics file;
 (b) reading one of the at least one set of font metrics from the printer metrics file; and,
 (c) creating an operating system font from the one read set of font metrics.

15. The program storage device of claim 14 wherein the method step of reading the one set of font metrics includes a method step of reading at least the width and height of the font represented by the one read set of font metrics.

16. The program storage device of claim 14 wherein the method step of creating the operating system font from the one read set of font metrics includes the method steps:
 (a) applying the one read set of font metrics to a font template; and,
 (b) saving the font template as an operating system font.

17. The program storage device of claim 14 wherein the method steps further include installing the operating system font on an operating system.

18. The program storage device of claim 17 wherein the method steps further include registering the operating system font with an operating system.

19. The program storage device of claim 14 wherein the method steps further include:
 (a) determining a name for the operating system font; and,
 (b) recording the name of the operating system font with a printer driver associated with the printer metrics file.

20. The program storage device of claim 14 wherein the method steps further include repeating the method steps (b) and (c) for each of the at least one set of font metrics contained in the printer metrics file.

* * * * *